United States Patent
Gorin et al.

(10) Patent No.: US 7,495,171 B2
(45) Date of Patent: Feb. 24, 2009

(54) WALL PLATE WITH FLEXIBLE SCREEN FOR PASSAGE OF COMMUNICATION CABLE

(75) Inventors: Thomas Michael Gorin, Atlanta, GA (US); James Loye Hutchinson, Dallas, GA (US)

(73) Assignee: Data:) Comm Electronics, Inc., Norcross, GA (US)

( * ) Notice: Subject to any disclaimer, the term of this patent is extended or adjusted under 35 U.S.C. 154(b) by 115 days.

(21) Appl. No.: 11/600,641

(22) Filed: Nov. 16, 2006

(65) Prior Publication Data
US 2008/0115955 A1   May 22, 2008

(51) Int. Cl.
*H02G 3/14* (2006.01)
(52) U.S. Cl. .................... 174/66; 174/67; 220/241; 439/139
(58) Field of Classification Search .............. 174/66, 174/67; 220/241, 242; 439/139; D13/177
See application file for complete search history.

(56) References Cited

U.S. PATENT DOCUMENTS

| | | | |
|---|---|---|---|
| 1,798,152 A | | 3/1931 | Farley |
| 2,515,820 A | * | 7/1950 | Clark .......................... 40/542 |
| 3,438,534 A | | 4/1969 | Zerwes |
| 3,773,969 A | | 11/1973 | Geisel |
| 4,353,759 A | | 10/1982 | Stallings |
| 4,688,747 A | | 8/1987 | Helmsdorfer et al. |
| 6,013,875 A | * | 1/2000 | Fridenberg et al. ......... 174/68.3 |
| 6,286,698 B2 | | 9/2001 | Hague et al. |
| 6,462,277 B1 | | 10/2002 | Young et al. |

* cited by examiner

*Primary Examiner*—Dhiru R Patel
(74) *Attorney, Agent, or Firm*—Thomas, Kayden, Horstemeyer & Risley, LLP

(57) ABSTRACT

The wall plate structure (10) includes a wall plate (16) that has a rectangular opening (50) therein. A flat, flexible screen (18) is mounted to the back surface (46) of the wall plate and closes the opening (50). Openings (66, 67 and 68) are formed in the screen for the passage therethrough of communication cable (74). The wall plate structure is substantially flat to facilitate the mounting of communication equipment in flat abutment with the wall surface.

16 Claims, 5 Drawing Sheets

WALL PLATE WITH FLEXIBLE SCREEN FOR PASSAGE OF COMMUNICATION CABLE

FIELD OF THE INVENTION

This invention concerns a wall plate for mounting over an opening in a wall board, with the wall plate having an opening therein for the passage of communication cable from inside the wall structure to a communication device.

BACKGROUND OF THE INVENTION

When communication cable is to be extended through the interior of a hollow wall to the position of an electronic device, such as a wall mounted television set, the cable must pass through a hole in the wall to reach the device. Typically, a wall plate is applied over the hole, and the wall plate defines some sort of passage therethrough to pass the cable from the wall to the device. Examples for wall plates for passing communication cable are in U.S. Pat. Nos. D-503,156 and 4,688,747. These and other prior art wall plates for passing communication cable typically include an outwardly protruding shield or "nose" that visually covers the opening through the wall plate, with the cable passing through the opening and then outwardly at an angle through the nose opening, to extend to the communication device.

If the communication device is to be wall mounted, the nose of a wall plate or any other protrusion from the wall is likely to become an obstacle when mounting the communication device against the wall. If the nose is made so that it is shallow to form a smaller protrusion from the wall, its opening through the nose is likely to be smaller and, therefore, and the small nose opening may be an obstacle in drawing the cable through the wall plate to reach the communication device.

It is to the solution of the above-identified problems that this invention is directed.

SUMMARY OF THE INVENTION

Briefly, the invention concerns a wall plate structure for passing a communication cable through an opening in a wall structure without forming a protrusion extending from the wall. The wall plate structure includes a wall plate for mounting to the wall structure about the opening in the wall structure. The wall plate defines a wall plate opening for registration with the opening in the wall, and a screen is mounted to the wall plate and substantially closes the wall plate opening. The screen is substantially flat and defines at least one opening for the passage of the communication cable from the wall, through the wall opening, and to the communication device that is to be mounted outside the wall.

The screen of the wall plate structure is formed of flexible material and the flexible material defines at least one flexible opening therethrough. In one embodiment of the invention, the flexible opening may comprise a star-cut opening, where intersecting slits are formed in the screen at, for example, 60° angles. The slits form flexible pointed leaves that naturally extend in the same plane as the screen and substantially close the wall plate opening. When communication cable is thrust through the star cut openings the pointed portions of the flexible leaves yield and are urged out of that plane by the communication cable, leaving an opening for the cable. The elasticity of the leaves causes the leaves to be biased toward the cable, tending to surround the cable and seal the screen about the cable.

The screen of the wall plate structure may be transparent or opaque, including a color that is approximately the same as the color of the wall plate.

The screen of the wall plate structure may include openings of different sizes, such that the star shaped openings may flex to different sizes to accommodate cable of different thicknesses. The openings in the screen may have a central circular opening with star cuts intersecting the central opening. The openings of the screen may be of other shapes, as desired.

Another feature of the invention may be that the wall plate of the wall plate structure includes a front surface facing out from the wall and a back surface that faces the wall. The back surface defines a perimeter groove about the wall plate opening. The screen may define a perimeter that is of less thickness than the central portion of the screen, so that the thin perimeter may be mounted in the reduced thickness perimeter that surrounds the opening of the wall plate, such that the larger thickness central portion of the screen can project into the opening of the wall plate. This results in the central portion of the screen being substantially coextensive with the front surface of the wall plate.

The wall plate structure may also include an internal support frame that is mounted in the wall opening and projects back into the hollow wall, and the wall plate is fastened to the support frame. This firmly attaches the wall plate structure to the wall about the wall opening.

Another feature that the invention may include is protrusions that extend from the back surface of the wall plate in a shape that corresponds to the shape of the support frame. The wall plate can be placed against the wall at the desired position and urged with enough force so the protrusions penetrate the uncut wall. The protrusions form a visual impression in the surface of the wall. This indicates the size and location of the hole that is to be cut by the worker in the wall board.

Other features and advantages of the invention will be derived from the following specification and the accompanying drawings.

DETAILED DESCRIPTION

Figure 1:
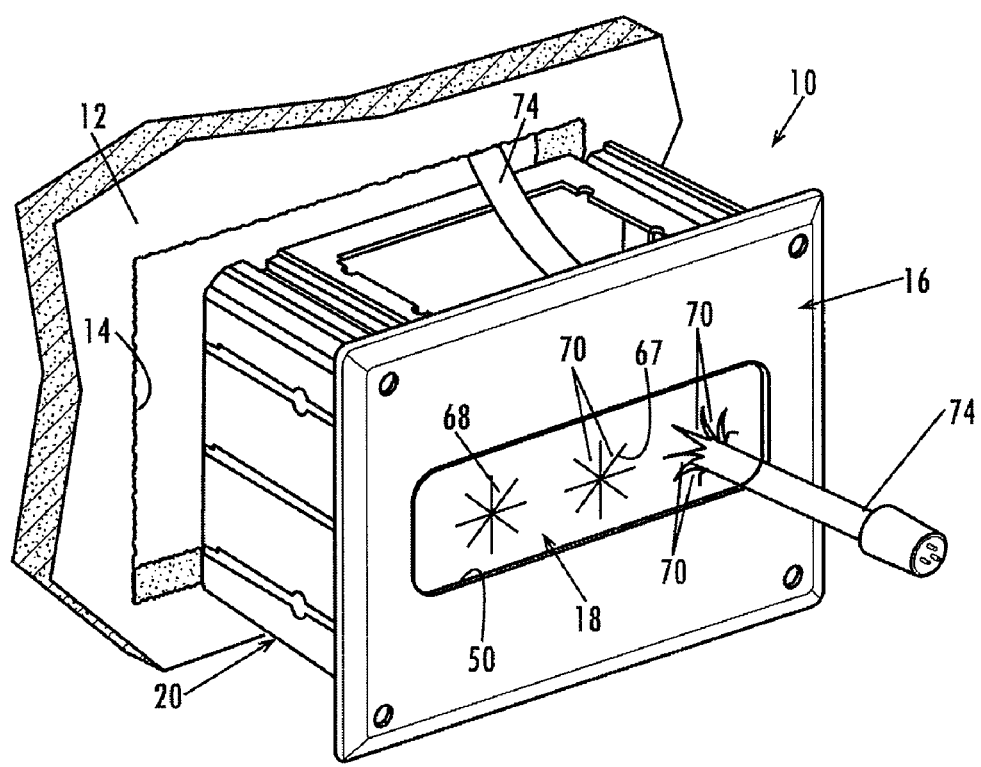
FIG. 1 is a perspective view of the assembled wall plate structure suspended away from a wall surface.

Referring now in more detail to the drawings, in which like numerals indicate like parts throughout the several views, FIG. 1 shows the wall plate structure 10 that is to be mounted to a hollow wall or like structure that typically includes wall board panels that are mounted to opposite sides of studs in a wall so that the wall structure is hollow. Communication cable and other items are passed through the wall structure. FIG. 1 illustrates a wall board 12 of a typical hollow wall structure with an opening 14 formed therein. The wall plate structure 10 is to be telescopically inserted through the wall opening 14 and suspended in the opening.

The wall plate structure 10 includes a wall plate 16, screen 18, and support frame 20. The support frame 20 is box-shaped and is to be thrust through the wall opening 14 so that it is out of sight when in normal use.

Figure 2:
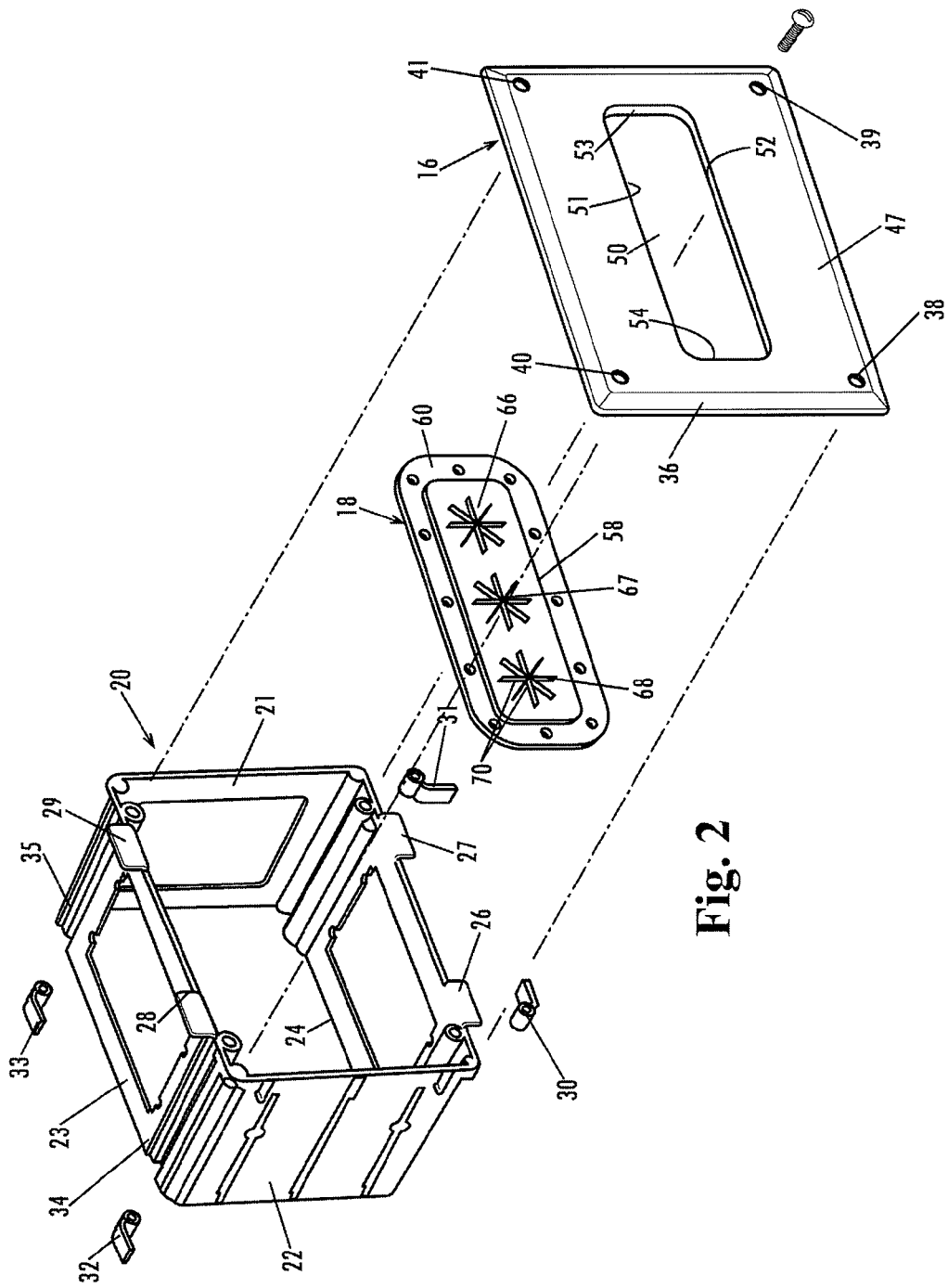
FIG. 2 is an expanded perspective view of the wall plate structure, showing the wall plate and the screen suspended out in front of the support frame.

As shown in FIG. 2, the support frame 20 includes opposed side walls 21 and 22, opposed top and bottom walls 23 and 24, and an open rear and front. The side walls, top and bottom walls, and rear portions of the frame may be open for the passage of communication cable and other devices. Also, electronic components can be suspended from the frame 20, such as a surge protector.

Retaining tabs 26, 27, 28 and 29 are formed on the front surface of the top and bottom walls 23 and 24 of support frame 20 so that when the support frame is inserted through the wall opening 14, the tabs will engage the facing surface of the wall board 12 and prevent further insertion of the support frame 20 into the hollow wall. This locates the support frame in its desired position.

Pivotal retaining flaps 30, 31, 32 and 33 are inserted in the grooves formed at the corners of the support frame 20, such as grooves 34 and 35. The pivotal retaining flaps 30-33 are pivoted out of the way when the support frame 20 is being pushed through the wall opening 14, and when the support frame 20 is in its proper position, the pivotal retaining flaps 30-33 are pivoted so that they extend behind the wall board 12 so that the wall plate structure 10 will not inadvertently fall out of the wall board.

Wall plate 16 is a substantially flat, rectangular plate, usually including beveled edges about its perimeter, as shown by beveled edge 36 in FIG. 2. Connector openings 38, 39, 40, and 41 are located at the corners of the wall plate 16, and fasteners such as threaded screws are inserted through the openings and are connected to the grooves, such as grooves 34 and 35 of the support frame.

Figure 3:
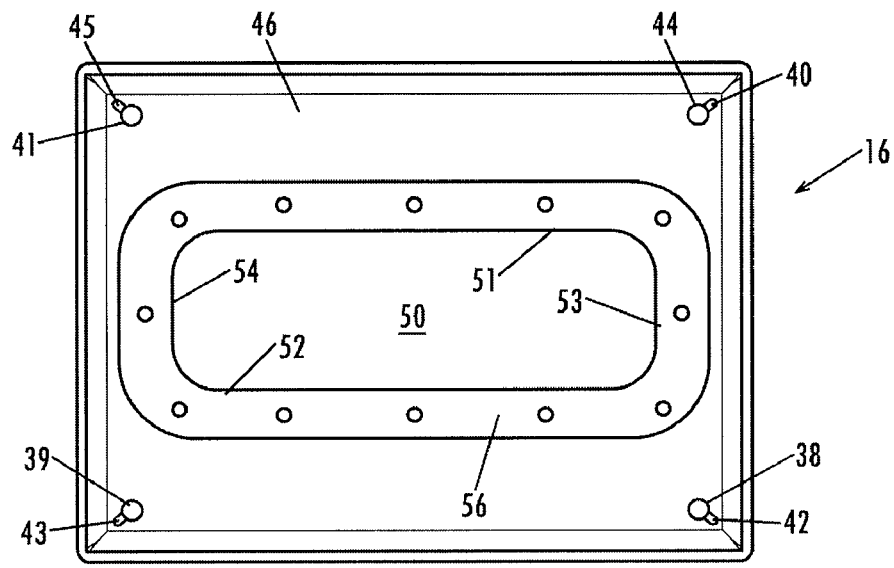
FIG. 3 is a back view of the wall plate.
Figure 4:
FIG. 4 is a top view of the wall plate.
Figure 5:
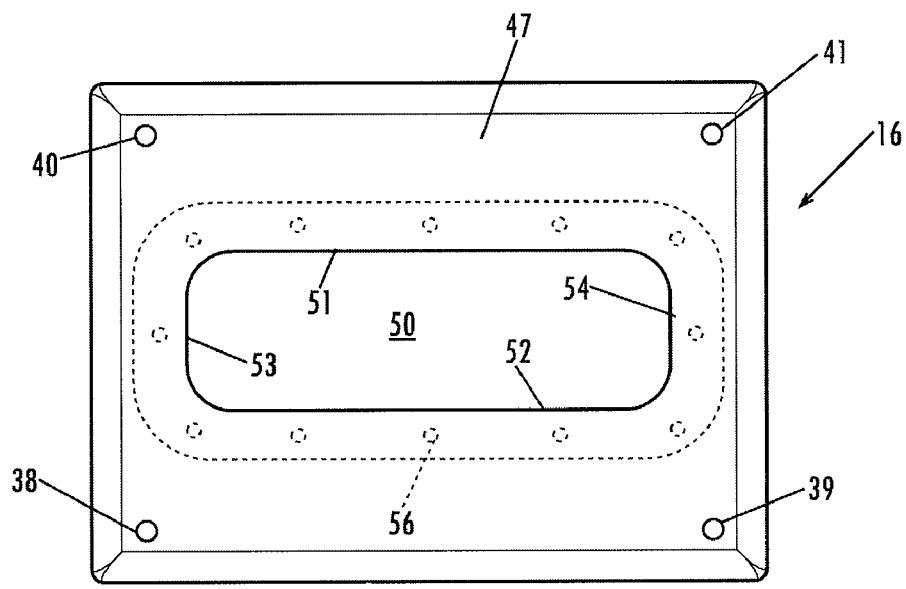
FIG. 5 is a front view of the wall plate.

As shown in FIG. 3, the wall plate 16 includes positioning pins 42, 43, 44, and 45 that form protrusions that extend away from the back surface 46 of the wall plate. When the wall plate structure 10 is to be installed in a wall, the wall plate 16 can be positioned at the correct location on the wall surface, with the back surface facing the wall surface, and a force is applied to the front surface 47, causing the positioning pins 42 to penetrate the wall surface. This provides a rectangular array of indentations in the wall surface so that the person installing the wall plate structure may cut the opening 14 in the wall that corresponds to the pin locations. The pin locations are arranged so as to correspond to the desired dimensions of the wall opening 14 in which the wall plate structure is to be mounted. Therefore, the installer is provided with a convenient means by which the wall opening 14 may be cut to the proper size and location.

Wall plate 16 defines a centrally located, generally rectangular wall plate opening 50, having opposed horizontal edges 51 and 52 and opposed vertical edges 53 and 54, with rounded corners joining the edges. As shown in FIG. 3, the back surface 46 of the wall plate 16 includes a perimeter groove 56 that surrounds the wall plate opening 50 so that a reduced thickness groove is formed completely about the wall plate opening 50. The opposed front surface 47 of the wall plate may be substantially flat.

As shown in FIGS. 6-10, the screen 18 is formed with a rectangular perimeter with rounded corners, including a central portion 58 that matches the shape of the wall plate opening 50, and a reduced thickness perimeter 60 that is to be positioned in the perimeter groove 56 of the back surface 46 of the wall plate 16. The central portion 58 is thicker than the reduced thickness perimeter 60, and when the screen 18 is placed in registration with the wall plate opening 50, the thicker central portion 58 registers with the wall plate opening while the reduced thickness perimeter 60 registers with the perimeter groove 56. This tends to accurately locate and retain the screen 18 in the wall plate opening 50.

Preferably, the screen is formed of flexible plastic material such as polyvinylchloride, and when in place on the back surface 46 of the wall plate 16, it can be adhered to the wall plate by heat fusion. Also, adhesives, connector, or other connecting devices may be used for the purpose of connecting the screen 18 to the wall plate 16. The heat fused spots 64 illustrate how heat fusion can be used to connect the screen 18 to the wall plate.

Figure 6:
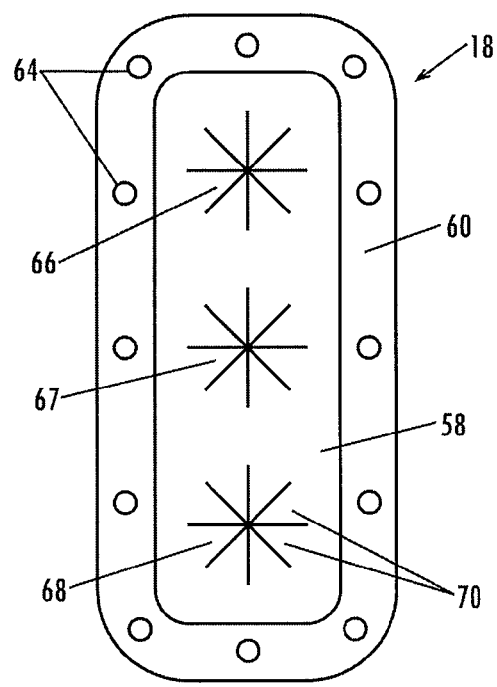
FIG. 6 is a back view of the screen.
Figure 8:
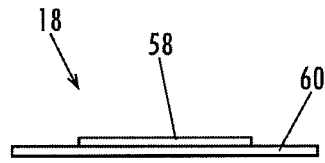
FIG. 8 is a top view of the screen.
Figure 7:
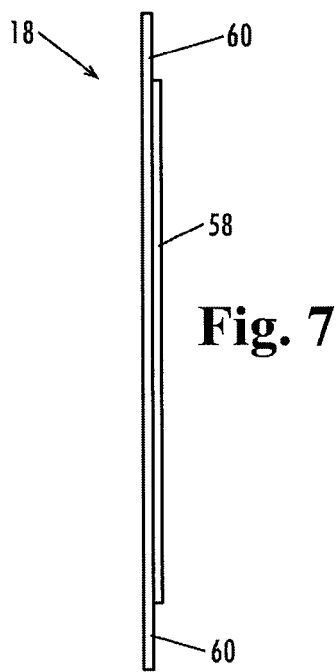
FIG. 7 is a side view of the screen.
Figure 9:
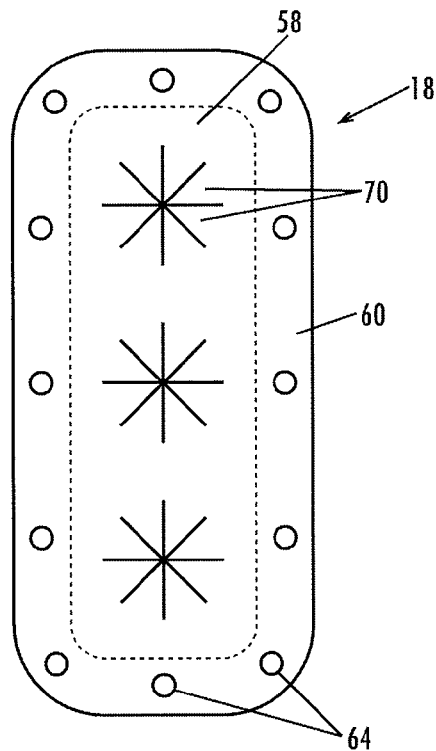
FIG. 9 is a front view of the screen.
Figure 10:
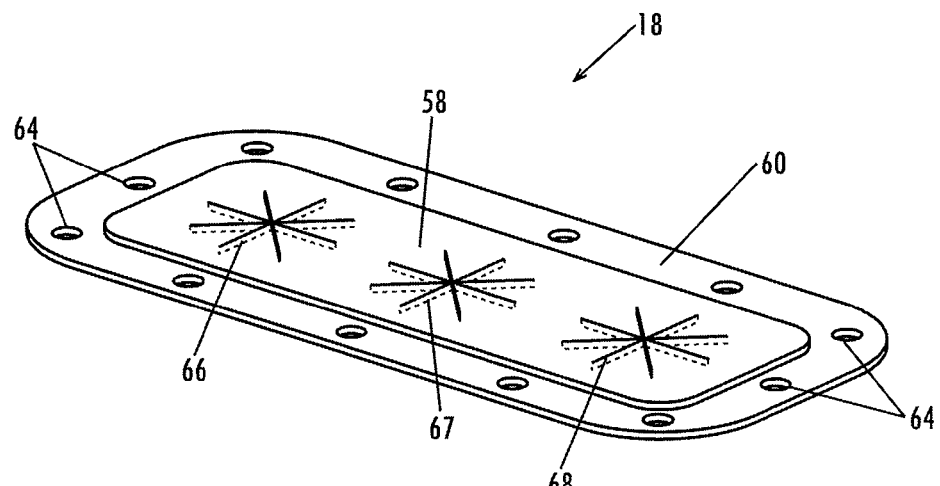
FIG. 10 is a perspective view of the screen, showing the front surface of the screen.

The screen 18 defines openings therethrough for the passage of communication cable. For example, FIGS. 6, 9 and 10 illustrate star-cut openings 66, 67 and 68 that are formed in the screen 18. In this example, three star-cut openings are shown, but other numbers of openings may be formed. Also, the openings, while in the star-cut shape, may be of different configurations.

With the star-cut openings 66-68, the slits that form the openings create flexible wedge-shaped leaves 70 that extend toward one another, and which in their relaxed condition generally close and substantially seal the opening through the screen, thereby retarding the movement of air, insects, or other items from passing through the screen. Since the material of the screen 18 that surrounds the openings is flexible, when an object such as a communications cable is pushed into the openings the openings expand to accept the shape of the cable and generally cling to the cable, tending to close the openings about the cable. This tends to seal the screen to the cable.

In the embodiments illustrated herein, the central star-cut opening 67 is of larger breadth than the adjacent star-cut openings so that communication cable of larger sizes may be passed through the central star-cut opening, if desired.

Figure 11:
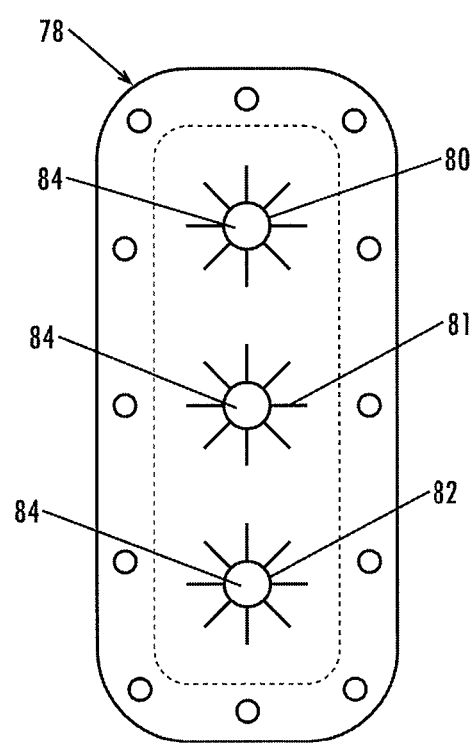
FIG. 11 is front view of an alternate embodiment of the screen.

FIG. 11 illustrates another embodiment of the screen 78 that has different shaped openings 80, 81 and 82. The star cuts intersect a circular opening 84. This shape of the openings tends to more readily seal to the usual round exterior shape of the cable. Other shapes and sizes of openings may be formed in the screen if desired. Preferably, the material of the screen at the openings is flexible to adjust to the size of the cable that is to pass through the openings.

Although a preferred embodiment of the invention has been disclosed in detail herein, it will be obvious to those skilled in the art that variations and modifications of the disclosed embodiment can be made without departing from the spirit and scope of the invention as set forth in the following claims.

We claim:

1. A wall plate structure for passing a communications cable through an opening in a wall, comprising:
   a wall plate for mounting to the wall about the opening in the wall, the wall plate defining therein a wall plate opening for registration with the opening in the wall,
   a screen mounted to the wall plate and substantially closing the wall plate opening,
   the screen defining at least one flexible opening therein for passage of communication cable
   a support frame for mounting in the wall opening,
   attachment means connecting the wall plate to the support frame,
   the wall plate comprises a front surface and a back surface, protrusions extending from the back surface of the plate in a rectangular array for penetrating the wall structure, the protrusions being spaced from one another distances that correspond to the shape of the frame, such that the opening in the wall may be formed to the size of the support frame by cutting the opening to the size of the penetrations formed in the wall by the protrusions extending from the back surface of the wall plate.

2. The wall plate structure of claim 1, wherein the at least one flexible opening comprises a star cut opening.

3. The wall plate structure of claim 1, wherein the screen is flat and transparent.

4. The wall plate structure of claim 1, wherein the screen is flat and opaque.

5. The wall plate structure of claim 1, wherein the wall plate opening is rectangular and the at least one opening in the screen comprises three star cut openings positioned in alignment with one another along the length of the rectangular opening.

6. The wall plate structure of claim 1, wherein the at least one opening comprises at least two openings of different sizes.

7. The wall plate structure of claim 1, wherein the wall plate comprises a front surface and a back surface, and the back surface defines a perimeter groove about the wall plate opening, and wherein the screen defines central portion and a perimeter that surrounds the central portion and is of less thickness than the central portion of the screen for mounting the perimeter to the back surface of the wall plate in the perimeter groove of the wall plate, such that the central portion of the screen is substantially coextensive with the front surface of the wall plate.

8. The wall plate structure of claim 1, wherein the screen is formed of flexible material and the star cut openings are flexible for deforming and accommodating the passage there through of communication cable.

9. The wall plate structure of claim 1, and further including a support frame for mounting in the wall opening, and attachment means connecting the wall plate to the support frame.

10. A wall plate structure for passing a communications cable through an opening in a wall, comprising:

a wall plate for mounting to the wall about the opening in the wall, the wall plate defining therein a wall plate opening for registration with the opening in the wall, a screen mounted to the wall plate and substantially closing the wall plate opening, the screen defining at least one flexible opening therein for passage of communication cable, the flexible opening having flexible leaves that are biased to a substantially closed position to close the flexible opening and that yield to pass a communication cable there through.

11. The wall plate structure of claim 10, wherein the wall plate has an external surface for facing away from the wall, and the screen has an external surface that is substantially coextensive with the external surface of the wall plate.

12. The wall plate structure of claim 10 wherein the screen has a perimeter that is mounted to the wall plate adjacent the wall plate opening.

13. The wall plate structure of claim 10, wherein the wall plate includes a back surface and the back surface defines a perimeter groove about the wall plate opening, and wherein the screen defines a perimeter that is of less thickness than the rest of the screen for mounting to the back surface of the wall plate in the perimeter groove of the wall plate.

14. The wall plate structure of claim 10, wherein the wall plate includes protrusions in a rectangular array extending from the back surface of the wall plate that may be used for forming a pattern on the wall for cutting a hole in the wall.

15. A wall plate structure for passing a communication cable through an opening in a hollow wall, including a wall plate for mounting to the wall about the opening in the wall, the wall plate defining a wall plate opening for registration with the opening in the wall, a screen is mounted to the wall plate and substantially closes the wall plate opening, the screen defines at least one opening for the passage of the communication cable from inside the wall, through the wall opening, to outside the wall for connection to a communication device, the screen of the wall plate structure is formed of flexible material and the flexible material defines at least one flexible star-cut opening with intersecting slits that form flexible pointed leaves that naturally extend in the same plane as the screen and substantially close the wall plate opening, such that when communication cable is thrust through the star cut openings the pointed portions of the flexible leaves yield and are urged out of the plane of the screen by the communication cable, leaving an opening for the cable, and the flexibility of the leaves causes the leaves to be biased toward the cable, tending to surround the cable and seal the screen about the cable.

16. The wall plate structure of claim 15, wherein the wall plate includes a back surface and the back surface defines a perimeter groove about the wall plate opening, and wherein the screen defines a perimeter that is of less thickness than the rest of the screen for mounting to the back surface of the wall plate in the perimeter groove of the wall plate.

* * * * *